US010313594B2

(12) United States Patent
Gera et al.

(10) Patent No.: US 10,313,594 B2
(45) Date of Patent: Jun. 4, 2019

(54) DYNAMICALLY CONFIGURING MEMORY BANDWIDTH FOR IMAGE GENERATION

(71) Applicant: QUALCOMM Incorporated, San Diego, CA (US)

(72) Inventors: Chandan Gera, Hyderabad (IN); Gaurav Gagrani, Kota (IN); Srikanth Uyyala, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/473,255

(22) Filed: Mar. 29, 2017

(65) Prior Publication Data

US 2018/0191993 A1    Jul. 5, 2018

(30) Foreign Application Priority Data

Jan. 5, 2017    (IN) .............................. 201741000501

(51) Int. Cl.
*H04N 5/225* (2006.01)
*H04N 5/232* (2006.01)
*H04N 5/77* (2006.01)

(52) U.S. Cl.
CPC ..... *H04N 5/23293* (2013.01); *H04N 5/23241* (2013.01); *H04N 5/77* (2013.01); *H04N 5/23216* (2013.01)

(58) Field of Classification Search
CPC .. H04N 5/23245; H04N 5/343; H04N 1/2112; H04N 1/212; H04N 1/215;
(Continued)

(56) References Cited

U.S. PATENT DOCUMENTS 7,110,025 B1 * 9/2006 Loui ...................... H04N 5/232
                                                                348/220.1
2003/0169278 A1 * 9/2003 Obrador ................ G06T 3/4015
                                                                345/629
(Continued)

FOREIGN PATENT DOCUMENTS

CN    104580908 A    4/2015
WO    2015117397 A1  8/2015

OTHER PUBLICATIONS

International Search Report and Written Opinion—PCT/US2017/062293—ISA/EPO—dated Feb. 9, 2018 (13 pp).
(Continued)

*Primary Examiner* — Kelly L Jerabek
(74) *Attorney, Agent, or Firm* — Shumaker & Sieffert, P.A.

(57) ABSTRACT

A device may include one or more processors, an image signal processor, and system memory. The one or more processors are configured to receive a request to accommodate a preview stream and a snapshot stream and output a request to increase a bandwidth between the image signal processor and the system memory to accommodate the preview stream in response to receiving the request to accommodate the preview stream and the snapshot stream. The request to increase the bandwidth to accommodate the preview stream refrains from accommodating the snapshot stream. Responsive to receiving a request to generate an image, for storage at the system memory, that corresponds to an image being output by the preview stream, the one or more processors are further configured to output a request to further increase the bandwidth between the image signal processor and the system memory to accommodate the snapshot stream.

27 Claims, 7 Drawing Sheets

(58) Field of Classification Search
CPC ............... H04N 1/2137; H04N 1/2145; G03B 2213/00; G03B 2213/02; G02B 23/14
See application file for complete search history.

(56) References Cited

U.S. PATENT DOCUMENTS

| | | | |
|---|---|---|---|
| 2004/0218059 A1* | 11/2004 | Obrador | H04N 1/212 348/220.1 |
| 2006/0050154 A1 | 3/2006 | Kobayashi et al. | |
| 2010/0053368 A1* | 3/2010 | Nanu | G06K 9/00248 348/224.1 |
| 2010/0079621 A1* | 4/2010 | Jang | G06K 9/00228 348/231.99 |
| 2010/0135644 A1* | 6/2010 | Taoka | H04N 1/2112 386/225 |
| 2012/0033103 A1* | 2/2012 | Corey | H04N 5/23245 348/231.6 |
| 2013/0076957 A1 | 3/2013 | Cheung et al. | |
| 2013/0208143 A1 | 8/2013 | Chou et al. | |
| 2013/0258136 A1 | 10/2013 | Lee | |
| 2015/0319367 A1 | 11/2015 | Kaplan et al. | |

OTHER PUBLICATIONS

Response to Written Opinion from corresponding PCT Application Serial No. PCT/US2017/062293 filed on Jul. 17, 2018 (23 pp).
Second Written Opinion of International Application No. PCT/US2017/062293, dated Nov. 5, 2018, 7 pp.
International Preliminary Report on Patentability from International Application No. PCT/US2017/062293, dated Jan. 24, 2019, 23 pages.

* cited by examiner

DYNAMICALLY CONFIGURING MEMORY BANDWIDTH FOR IMAGE GENERATION

This application claims priority to India provisional application no. 201741000501, filed on Jan. 5, 2017, the entire content of which is hereby incorporated by reference.

TECHNICAL FIELD

This disclosure relates to image generation and more particularly to configuring a bandwidth of system memory for image generation.

BACKGROUND

Devices for image generation (e.g., mobile devices, cameras, etc.) may operate in various modes including a preview mode and a snapshot mode. In the preview mode, a device for image generation may generate a preview stream for images captured by the device to display the images without storing the images in a system memory for long-term storage. In the snapshot mode, the device may generate a snapshot stream, and in response to receiving a user input during the preview stream, the device may store, in the system memory, using the snapshot stream, an image that corresponds to an image being output in the preview stream when the user input was received.

SUMMARY

This disclosure describes example techniques to reduce a power consumption of a device. More specifically, in response operating an image signal processor (ISP) in preview mode, rather than allocating bandwidth between the ISP and system memory to permit processing of both a preview stream and a snapshot stream, a host processor may increase an allocated bandwidth between the ISP and system memory to permit only the preview stream until receiving a request for a snapshot operation.

In one example, a method for image generation includes receiving a request to accommodate a preview stream and a snapshot stream. Responsive to receiving the request to accommodate the preview stream and a snapshot stream, the method further includes outputting a request to increase a bandwidth between an image signal processor and a system memory to accommodate the preview stream. The request to increase the bandwidth to accommodate the preview stream refrains from accommodating the snapshot stream. Responsive to receiving a request to generate an image, for storage at the system memory, that corresponds to an image being output by the preview stream, the method further includes outputting a request to further increase the bandwidth between the image signal processor and the system memory to accommodate the snapshot stream.

In some examples, a device may include one or more processors, an image signal processor, and system memory. The one or more processors are configured to receive a request to accommodate a preview stream and a snapshot stream. Responsive to receiving the request to accommodate the preview stream and a snapshot stream, the one or more processors are further configured to output a request to increase a bandwidth between the image signal processor and the system memory to accommodate the preview stream. The request to increase the bandwidth to accommodate the preview stream refrains from accommodating the snapshot stream. Responsive to receiving a request to generate an image, for storage at the system memory, that corresponds to an image being output by the preview stream, the one or more processors are further configured to output a request to further increase the bandwidth between the image signal processor and the system memory to accommodate the snapshot stream.

In some examples, a non-transitory computer-readable storage medium has stored thereon instructions that, when executed, cause one or more processors to receive a request to accommodate a preview stream and a snapshot stream. Responsive to receiving the request to accommodate the preview stream and a snapshot stream, the instructions further cause the one or more processors to output a request to increase a bandwidth between an image signal processor and a system memory to accommodate the preview stream. The request to increase the bandwidth to accommodate the preview stream refrains from accommodating the snapshot stream. Responsive to receiving a request to generate an image, for storage at the system memory, that corresponds to an image being output by the preview stream, the instructions further cause the one or more processors to output a request to further increase the bandwidth between the image signal processor and the system memory to accommodate the snapshot stream.

In some example, a device comprises means for receiving a request to accommodate a preview stream and a snapshot stream and means for outputting a request to increase a bandwidth between an image signal processor and a system memory to accommodate the preview stream in response to receiving the request to accommodate the preview stream and the snapshot stream. The request to increase the bandwidth to accommodate the preview stream refrains from accommodating the snapshot stream. The device further includes means for outputting a request to further increase the bandwidth between the image signal processor and the system memory to accommodate the snapshot stream in response to receiving a request to generate an image, for storage at the system memory, that corresponds to an image being output by the preview stream.

The details of one or more examples are set forth in the accompanying drawings and the description below. Other features, objects, and advantages will be apparent from the description, drawings, and claims.

DETAILED DESCRIPTION

Devices for image generation (e.g., mobile devices, cameras, etc.) may incorporate a number of processes that each use bandwidth between an image signal processor (ISP) and system memory. For example, a host processor may increase an allocated bandwidth between the ISP and system memory to permit operating the ISP in a preview mode (e.g., outputting images captured by a camera for display without storing the images). In another example, the host processor may increase the allocated bandwidth between the ISP and system memory to permit processing of a snapshot stream to permit operating the ISP in a snapshot mode (e.g., storing an image captured by a camera in the system memory).

A snapshot operation may be performed to capture an image that corresponds (e.g., captured at a same time) to an image being output by a preview stream. For example, a host processor may output a preview stream that includes images for output at a display. In response to receiving a user input indicating a snapshot operation, the host processor stores an image in system memory that corresponds to the image being output when the user input was received. In this example, the host processor may increase an allocated bandwidth between the ISP and system memory to permit processing of the preview stream and a snapshot stream for storing the image in the system memory.

Some application framework (e.g., Android™) allows software applications to access more camera functions than previous versions of the application framework. For example, hardware abstraction layer 3 (HAL3) increases an ability of software applications to control the camera subsystem on Android™ devices compared with hardware abstraction layer 1 (HAL1).

However, the additional functionality provided by such framework may result in increased power consumption by a device. For example, rather than using a high level preview and still capture request in HAL1, HAL3 application framework permits applications to simultaneously request a preview stream and a snapshot stream from an ISP. In the example, power consumption of the device is increased while the snapshot stream is active, even when a device is not requesting frames of the snapshot stream.

More specifically, when software applications using application framework request a preview stream and a snapshot stream from an ISP, the underlying kernel space for the application framework increases a frequency used for accessing memory (e.g., double-data rate synchronous dynamic random-access memory (DDR SDRAM), commonly referred to as "DDR") to provide additional bandwidth for both the preview stream and the snapshot stream. That is, in response to a request for the snapshot stream from a software application, the kernel space for the application framework causes a host processor, to increase a frequency used for accessing the memory to provide additional bandwidth suitable for both the preview stream and a snapshot stream, which increases power consumption of the device. As discussed further below, a device may be configured to support timely operation of the preview stream and the snapshot stream such that a delay in capturing an image for a snapshot operation is minimal.

An ISP may operate in zero-shutter lag (ZSL) mode, non-ZSL mode, or pseudo ZSL mode. In non-ZSL mode, the ISP captures content at a low resolution (e.g., 1080P or about 2.1 megapixels) and the ISP outputs only a preview stream to the application framework. In ZSL mode, the ISP captures content at a high resolution (e.g., 16 megapixels) and the ISP outputs both the preview stream and a snapshot stream to the application framework. In pseudo ZSL mode, the ISP captures content at the high resolution (e.g., 16 megapixels) and the ISP outputs only the preview stream to the application framework. However, because the ISP captures content at the high resolution, the ISP may output, without significant delay (i.e., ZSL), both the preview stream and the snapshot stream to the application framework.

In some techniques, in accordance with this disclosure, the host processor may delay increasing a frequency used for accessing system memory to accommodate additional bandwidth for the snapshot stream until receiving a request to capture a snapshot when an ISP is operating in pseudo ZSL mode. For example, when a software application using application framework requests a preview stream and a snapshot stream from an ISP, the underlying kernel space for the application framework causes the host processor to increase a frequency used for accessing memory to accommodate additional bandwidth suitable for only the preview stream when an ISP is operating in pseudo ZSL mode. In the example, the host processor increases the frequency used for accessing memory to accommodate additional bandwidth suitable for both the preview stream and the snapshot stream only after receiving a request to capture the snapshot (e.g. a request to store a frame being previewed in the preview stream in memory).

For example, a device receives a user interaction indicating a selection of an element in a software application to initiate a preview mode. In this example, preview mode permits the user to indicate a request to capture a snapshot (e.g., a 16 megapixel image) corresponding to an image being output in a preview stream (e.g., 720P) for the preview mode. For instance, in response to detecting a user interaction (e.g., tapping gesture) by a touch-sensitive display of the device while the touch-sensitive display outputs the preview stream, the device captures a snapshot corresponding to the frame being previewed at the touch-sensitive display of the device when the user interaction is detected. In the example, the software application requests, via application framework, the preview stream for output to the touch-sensitive display and a snapshot stream for capturing a frame currently output on the display. In the example, an ISP of the device operates in pseudo ZSL mode, where the ISP causes sensors of a camera device to capture image content at a high resolution (e.g., 16 MP) but the ISP only outputs a preview stream at a low resolution (e.g., 1080P).

More specifically, before receiving the user interaction while the touch-sensitive display outputs the preview stream, the kernel space for the application framework causes a host processor (e.g., central processing unit (CPU)) of the device to increase a frequency used for accessing memory to accommodate additional bandwidth only suitable for the preview stream. When the user interacts with the touch-sensitive display of the device to indicate a request to capture a snapshot being previewed by the device, the kernel space for the application framework causes the host processor of the device to further increase the frequency used for accessing memory to accommodate additional bandwidth suitable for both the preview stream and the snapshot stream and causes the snapshot to be stored in the memory. Because the ISP operates in pseudo ZSL mode, the snapshot to be stored in the memory substantially corresponds with the image being previewed in the preview stream when the user interacted with the touch-sensitive display of the device to indicate the request to capture the snapshot being previewed. In this way, power consumption of the device may be reduced while maintaining a functionality of the device.

Figure 1:
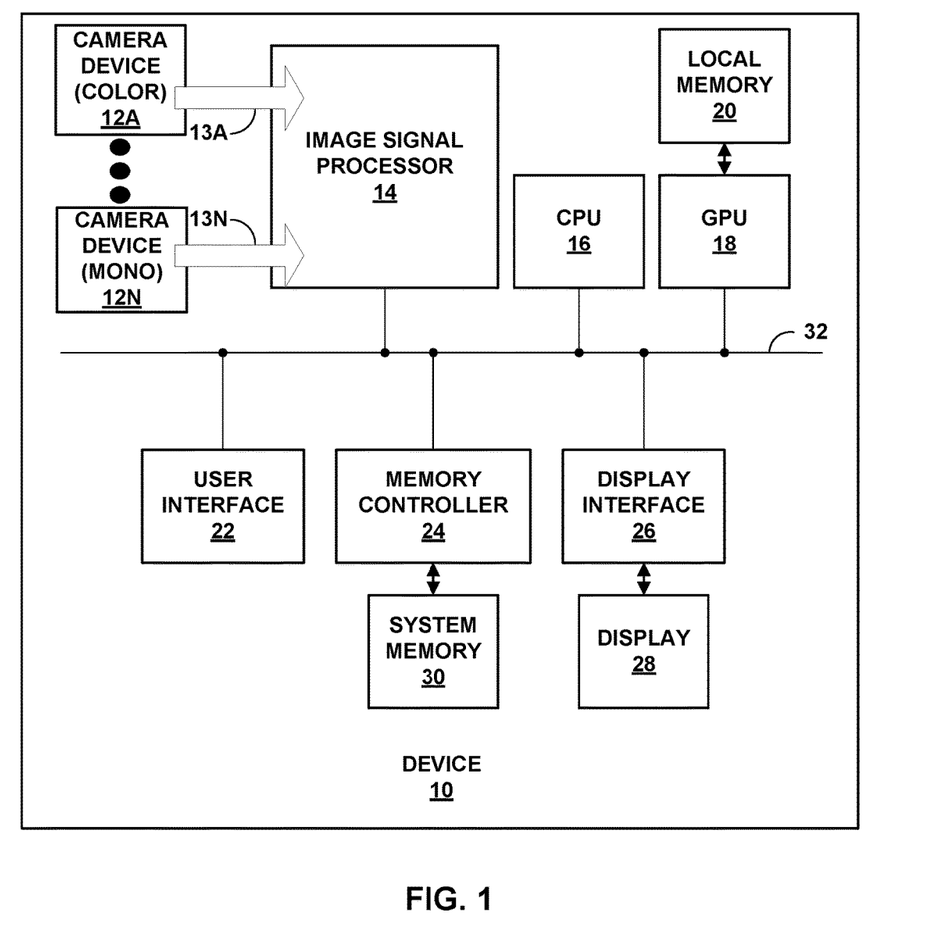
FIG. 1 is a block diagram of a device for image processing configured to perform one or more example techniques described in this disclosure.

FIG. 1 is a block diagram of a device 10 for image processing configured to perform one or more example techniques described in this disclosure. Examples of device 10 include a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a standalone camera, a television, a television set-top box, a server, an intermediate network device, a mainframe computer or any other type of device that includes a camera to capture photos or other types of image data.

As illustrated in the example of FIG. 1, device 10 includes a plurality of camera devices 12A-N (e.g., four cameras or nine cameras as two examples), at least one image signal processor (ISP) 14, a CPU 16, a graphical processing unit (GPU) 18 and local memory 20 of GPU 18, user interface 22, memory controller 24 that provides access to system memory 30, and display interface 26 that outputs signals that cause graphical data to be displayed on display 28.

Also, although the various components are illustrated as separate components, in some examples the components may be combined to form a system on chip (SoC). As an example, ISP 14, CPU 16, GPU 18, and display interface 26 may be formed on a common chip. In some examples, one or more of ISP 14, CPU 16, GPU 18, and display interface 26 may be in separate chips.

The various components illustrated in FIG. 1 may be formed in one or more microprocessors, application specific integrated circuits (ASICs), field programmable gate arrays (FPGAs), digital signal processors (DSPs), or other equivalent integrated or discrete logic circuitry. Examples of local memory 20 include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 1 communicate with each other using bus 32. Bus 32 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other image processing systems with the same or different components may be used to implement the techniques of this disclosure.

As illustrated, device 10 includes camera devices 12A-N. Camera devices 12A-N need not necessarily be part of device 10 and may be external to device 10. In such examples, ISP 14 may similarly be external to device 10; however, it may be possible for ISP 14 to be internal to device 10 in such examples. For ease of description, the examples are described with respect to camera devices 12A-N and ISP 14 being part of device 10 (e.g., such as in examples where device 10 is a mobile device such as a smartphone, tablet computer, handset, mobile communication handset, or the like).

Camera devices 12A-N as used in this disclosure refer to separate sets of pixels (e.g., camera device 12A includes a first set of pixels, camera device 12B includes a second set of pixels, and so forth). In some examples, each one of camera devices 12A-N may be considered as including a plurality of sensors, and each sensor includes a plurality of pixels. For example, each sensor includes three pixels (e.g., a pixel for red, a pixel for green, and a pixel for blue). As another example, each sensor includes four pixels (e.g., a pixel for red, two pixels for green used to determine the green intensity and overall luminance, a pixel for blue as arranged with a Bayer filter). Even in examples where camera devices 12A-N include a plurality of sensors that include a plurality of pixels, camera devices 12A-N each include a plurality of pixels. Other naming conventions may be used. For example, device 10 may be considered as including one camera, and camera devices 12A-N are respectively called sensors instead of cameras or sub-cameras. The techniques described in this disclosure are applicable to all of these examples.

Regardless of the specific naming convention, each of camera devices 12A-N may capture image content to generate one image. Each one of these images may be combined to generate a higher resolution image. However, in some examples, there may be sufficient resolution from any one of the images captured by camera devices 12A-N for display.

Each one of camera devices 12A-N may include its own aperture and lens. However, the techniques are not so limited. In some examples, there may be a common aperture and/or lens for camera devices 12A-N and an optical splitter and waveguide that transmits the captured light to respective ones of 12A-N. Other configurations are possible and contemplated by the techniques described in this disclosure.

The pixels of camera devices 12A-N should not be confused with image pixels. Image pixel is the term used to define a single "dot" on the generated image from the content captured by camera devices 12A-N. For example, the image generated based on the content captured by any one of camera devices 12A-N includes a determined number of pixels (e.g., megapixels).

However, the pixels of camera devices 12A-N are the actual photosensor elements having photoconductivity (e.g., the elements that capture light particles in the viewing spectrum or outside the viewing spectrum). The pixels of camera devices 12A-N conduct electricity based on intensity of the light energy (e.g., infrared or visible light) striking the surface of the pixels. The pixels may be formed with germanium, gallium, selenium, silicon with dopants, or certain metal oxides and sulfides, as a few non-limiting examples.

In some examples, the pixels of camera devices 12A-N may be covered with red-green-blue (RGB) color filters in accordance with a Bayer filter. With Bayer filtering, each of the pixels may receive light energy for a particular color component (e.g., red, green, or blue). Accordingly, the current generated by each pixel is indicative of the intensity of red, green, or blue color components in the captured light.

ISP 14 is configured to receive the electrical currents from respective pixels of camera devices 12A-N and process the electrical currents to generate an image. Although one ISP 14 is illustrated, in some examples, there may be a plurality of ISPs (e.g., one per camera devices 12A-N). Accordingly, in some examples, there may be one or more ISPs like ISP 14 in device 10.

In addition to converting analog current outputs to digital values, ISP 14 may perform some additional post-processing to increase the quality of the final image. For example, ISP 14 may evaluate the color and brightness data of neighboring image pixels and perform demosaicing to update the color and brightness of the image pixel. ISP 14 may also perform noise reduction and image sharpening, as additional examples. ISP 14 outputs the resulting images (e.g., pixel values for each of the image pixels) to system memory 30 via memory controller 24.

CPU 16 may comprise a general-purpose or a special-purpose processor that controls operation of device 10. A user may provide input to device 10 to cause CPU 16 to execute one or more software applications. The software applications that execute on CPU 16 may include, for example, an operating system, a word processor application, an email application, a spread sheet application, a media player application, a video game application, a graphical user interface application or another program. The user may provide input to device 10 via one or more input devices (not shown) such as a keyboard, a mouse, a microphone, a touch pad or another input device that is coupled to device 10 via user interface 22.

As one example, the user may execute an application to capture an image. The application may present real-time image content on display 28 for the user to view prior to taking an image. In some examples, the real-time image content displayed on display 28 may be the content from one of camera devices 12A-N. The code for the application used to capture image may be stored on system memory 30 and CPU 16 may retrieve and execute the object code for the application or retrieve and compile source code to obtain object code, which CPU 16 may execute to present the application.

When the user is satisfied with the real-time image content, the user may interact with user interface 22 (which may be a graphical button displayed on display 28) to capture the image content. In response, one or more camera devices 12A-N may capture image content and ISP 14 may process the received image content to generate a plurality of images. In some examples, rather than camera devices 12A-N capturing images in all cases, the application executing on CPU 16 may output via display 28 an option for the user to select high resolution image generation. In response, each one of camera devices 12A-N would capture images. If high resolution image generation is not selected, one of camera devices 12A-N captures image content. Alternatively, all camera devices 12A-N may capture images in all instances. However, ISP 14 may not process the resulting content from all camera devices 12A-N in all instances.

Memory controller 24 facilitates the transfer of data going into and out of system memory 30. For example, memory controller 24 may receive memory read and write commands, and service such commands with respect to system memory 30 in order to provide memory services for the components in device 10. Memory controller 24 is communicatively coupled to system memory 30. Although memory controller 24 is illustrated in the example device 10 of FIG. 1 as being a processing module that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by ISP 14, CPU 16, and GPU 18. For example, system memory 30 may store user applications, resulting images from ISP 14, intermediate data, and the like. System memory 30 may additionally store information for use by and/or generated by other components of device 10. For example, system memory 30 may act as a device memory for ISP 14. System memory 30 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 30 may include instructions that cause ISP 14, CPU 16, GPU 18, and display interface 26 to perform the functions ascribed to these components in this disclosure. Accordingly, system memory 30 may represent a computer-readable storage medium having instructions stored thereon that, when executed, cause one or more processors (e.g., ISP 14, CPU 16, GPU 18, and display interface 26) to perform various aspects of the techniques described in this disclosure.

In some examples, system memory 30 may represent a non-transitory computer-readable storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from device 10, and moved to another device. As another example, memory, substantially similar to system memory 30, may be inserted into device 10. In certain examples, a non-transitory storage medium may store data that can, over time, change (e.g., in RAM).

ISP 14, CPU 16, and GPU 18 may store image data, and the like in respective buffers that are allocated within system memory 30. Display interface 26 may retrieve the data from system memory 30 and configure display 28 to display the image represented by the rendered image data. In some examples, display interface 26 may include a digital-to-analog converter (DAC) that is configured to convert the digital values retrieved from system memory 30 into an analog signal consumable by display 28. In other examples, display interface 26 may pass the digital values directly to display 28 for processing.

Display 28 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 28 may be integrated within device 10. For instance, display 28 may be a screen of a mobile telephone handset or a tablet computer. Alternatively, display 28 may be a stand-alone device coupled to device 10 via a wired or wireless communications link. For instance, display 28 may be a computer monitor or flat panel display connected to a personal computer via a cable or wireless link.

In accordance with the techniques described in this disclosure, rather than allocating bandwidth between ISP 14 and system memory 30 to permit processing of both a preview stream and a snapshot stream, CPU 16 may increase an allocated bandwidth between ISP 14 and system memory 30 to permit only the preview stream until receiving a request for a snapshot operation. In the example of FIG. 1, increasing bandwidth causes memory controller 24 to increase an operating frequency of system memory 30. As such, refraining from increasing allocated bandwidth between ISP 14 and system memory 30 to permit the snapshot stream until receiving the request for a snapshot operation reduces an operating frequency of system memory 30, thereby reducing a power consumption of device 10.

In operation, responsive to receiving a request to accommodate a preview stream and a snapshot stream, CPU 16 outputs, to memory controller 24, a request to increase a bandwidth between ISP 14 and system memory 30 to accommodate the preview stream, where the request to increase the bandwidth to accommodate the preview stream refrains from accommodating the snapshot stream. Responsive to receiving a request to generate an image, for storage at system memory 30, that corresponds to an image being output by the preview stream, CPU 16 outputs, to memory controller 24, a request to further increase the bandwidth to accommodate the snapshot stream. In this way, device 10 refrains from increasing an operating frequency of system memory 30 to accommodate additional bandwidth for the snapshot stream until receiving the request for a snapshot operation, thereby reducing a power consumption of device 10.

Figure 2:
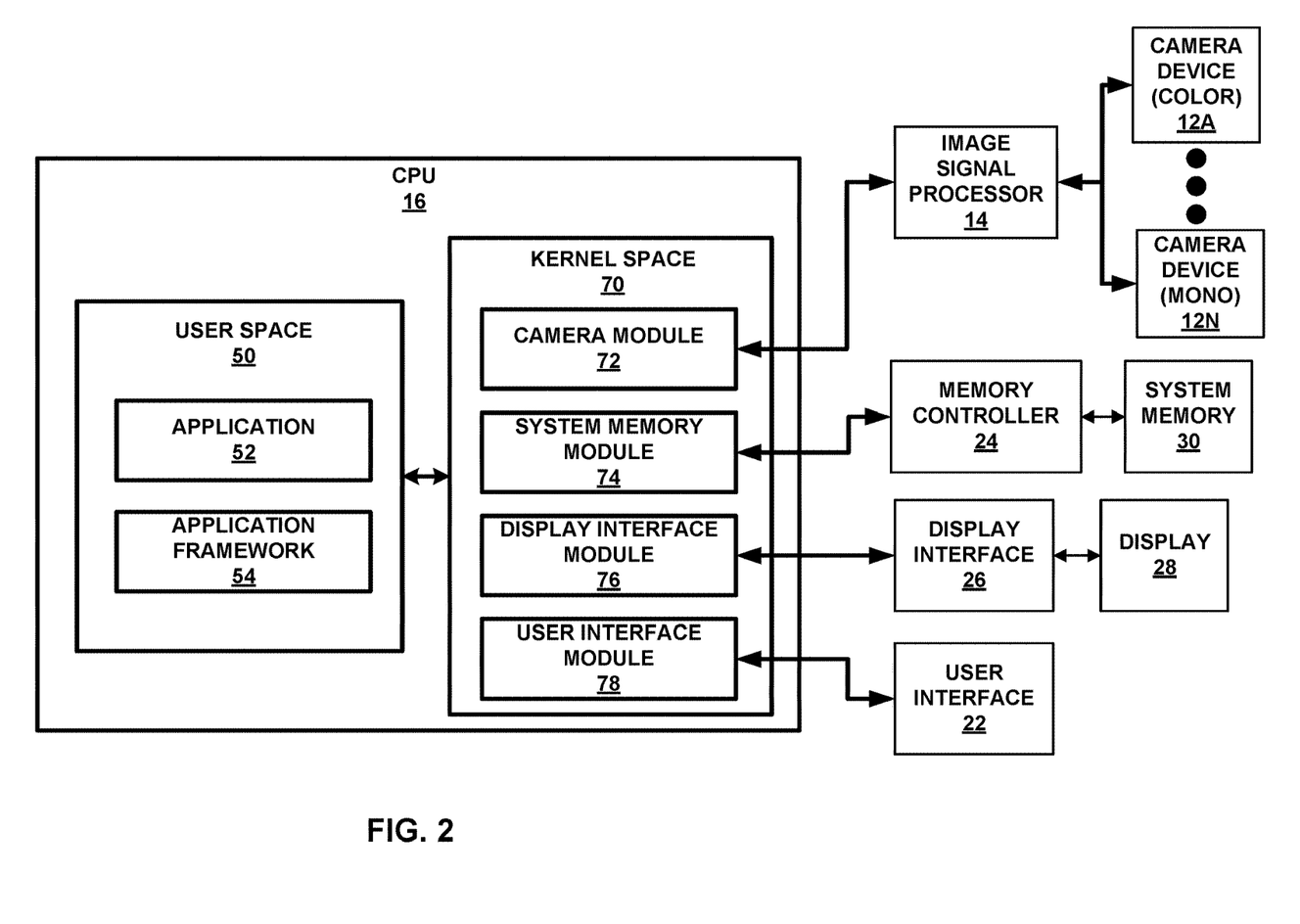
FIG. 2 is a diagram showing components of FIG. 1 in more detail, in accordance with one or more aspects of the present disclosure.

FIG. 2 is a diagram showing components of FIG. 1 in more detail, in accordance with one or more aspects of the present disclosure. FIG. 2 includes CPU 16, ISP 14, camera devices 12A-N, memory controller 24, system memory 30, display interface 26, display 28, and user interface 22. As shown, user space 50 and kernel space 70 may be executed by CPU 16. User space 50 may include application 52 and application framework 54. Kernel space 70 may include camera module 72, system memory module 74, display interface module 76, and user interface module 78.

Application 52 may include one or more applications that execute on CPU 16, for example, but not limited to, an operating system, a word processor application, an email application, a spread sheet application, a media player application, a video game application, a graphical user interface application or another program. As one example, a user may execute an application to capture an image. The application may present real-time image content on display 28 for the user to view prior to taking an image. In some examples, the real-time image content displayed on display 28 may be the content from one of camera devices 12A-N (e.g., preview mode). The code for the application used to capture image may be stored on system memory 30 and CPU 16 may retrieve and execute the object code for the application or retrieve and compile source code to obtain object code, which CPU 16 may execute to present the application.

Application framework 54 may include software framework that may be used to with application 52. Examples of application framework 54 may include, but are not limited to, MacApp, Microsoft Foundation Class Library, Oracle Application Development Framework, MARTHA, and other application frameworks. In some examples, an application framework 54 may include one or more application program interfaces (APIs).

Camera module 72 may be configured to operate functions of camera devices 12A-N according to outputs from user space 50. Camera module 72 may include one or more components of a hardware abstraction layer (HAL). For instance, camera module 72 may include one or more components for a hardware abstraction layer 3 (HAL3). In some examples, camera module 72 may include one or more components of a device driver for ISP 14.

Camera module 72 may be configured to control one or more sensors of camera devices 12A-N. For example, camera module 72 may output, an instruction to camera device 12A to set a sensor of camera devices 12A-N to capture images at a high resolution (e.g., 16 megapixels). In another example, camera module 72 may output, an instruction to camera device 12A to set a sensor of camera devices 12A-N to capture images at a low resolution (e.g., 1080P or about 2.1 megapixels).

Camera module 72 may be configured to operate ISP 14 in zero-shutter lag (ZSL) mode, non-ZSL mode, or pseudo ZSL mode. In non-ZSL mode, ISP 14 captures content at a low resolution (e.g., 1080P or about 2.1 megapixels) and ISP 14 outputs only a preview stream to application framework 54. In ZSL mode, ISP 14 captures content at a high resolution (e.g., 16 megapixels) and ISP 14 outputs both the preview stream and a snapshot stream to application framework 54. In pseudo ZSL mode, ISP 14 captures content at the high resolution (e.g., 16 megapixels) and ISP 14 outputs only the preview stream to application framework 54. For instance, camera module 72 may be configured to instruct ISP 14 to cause camera devices 12A-N to capture content at a first resolution (e.g., the high resolution) and to output a representation of the captured content in a preview stream at a second resolution (e.g., the low resolution) that is less than the first resolution. Because ISP 14 captures content at the high resolution during pseudo ZSL mode, ISP 14 may output, without significant delay (e.g., ZSL), both the preview stream, which may include images at the low resolution, and the snapshot stream, which may include images at the high resolution, to application framework 54.

Camera module 72 may be configured to receive a request to accommodate a preview stream and a snapshot stream. For example, camera module 72 may receive, from application 52, via application framework 54, a request to activate a preview stream and a snapshot stream. In some examples, the request to accommodate the preview stream may include an indication to provide bandwidth for the preview stream and the snapshot stream. For instance, a request to accommodate a preview stream may include an instruction to request additional bandwidth for both the preview stream and the snapshot stream.

System memory module 74 may be configured to operate functions of system memory 30 according to outputs from user space 50. System memory module 74 may include one or more components of a hardware abstraction layer. For instance, system memory module 74 may include one or more components for a hardware abstraction layer 3 (HAL3). In some examples, system memory module 74 may include one or more components of a device driver for memory controller 24 and/or system memory 30.

System memory module 74 may be configured to output an indication of a frequency to operate system memory 30. For example, system memory module 74 may perform a bandwidth voting operation that solicits an amount of bandwidth requested for each of modules 72-78. Examples of processes that may be used in bandwidth voting from camera module 72 may include, but are not limited to, data relating to one or more sensors of camera devices 12A-N, data output by ISP 14, data associated with CPP, data associated with JPEG standard (e.g., SO/IEC 10918), data associated with stats for camera devices 12A-N, and other processes. In this example, system memory module 74 determines a combined amount of bandwidth for each of modules 72-78 and outputs an indication of a frequency to operate system memory 30 that satisfies the combined amount of bandwidth to memory controller 24.

System memory module 74 may be configured to calculate a bandwidth between ISP 14 and system memory 30. For example, responsive to receiving a request to accommodate a preview stream and a snapshot stream, system memory module 74 may calculate a bandwidth between ISP 14 and system memory 30 to accommodate additional bandwidth for the preview stream. In some examples, system memory module 74 may cause system memory 30 to operate at a frequency that is determined using the bandwidth. For instance, system memory module 74 may modify a frequency to operate system memory 30 such that system memory satisfies (e.g., exceeds) the bandwidth.

Display interface module 76 may be configured to operate functions of display 28 according to outputs from user space 50. Display interface module 76 may include one or more components of a hardware abstraction layer. For instance, display interface module 76 may include one or more components for a hardware abstraction layer 3 (HAL3). In some examples, display interface module 76 may include one or more components of a device driver for display 28 and/or display interface 26.

Display interface module 76 may be configured to cause display 28 to output imagines contained in a preview stream. For example, display interface module 76 may be configured to output an instruction to display interface 26 to retrieve images contained in the preview stream from system memory 30. In this example, display interface 26 may retrieve the images contained in the preview stream and cause display 28 to output the images contained in the preview stream.

Display interface module 76 may be configured to cause display 28 to output imagines contained in a snapshot stream. For example, display interface module 76 may be configured to output an instruction to display interface 26 to retrieve images contained in the snapshot stream from system memory 30. In this example, display interface 26 may retrieve the images contained in the snapshot stream and cause display 28 to output the images contained in the snapshot stream.

User interface module 78 may be configured to operate functions of user interface 22 according to outputs from user space 50. User interface module 78 may include one or more components of a hardware abstraction layer. For instance, user interface module 78 may include one or more components for a hardware abstraction layer 3 (HAL3). In some examples, user interface module 78 may include one or more components of a device driver for user interface 22.

In operation, camera module 72 receives a request to accommodate a preview stream and a snapshot stream. For instance, application 52, via application framework 54, outputs the request to accommodate a preview stream and a snapshot stream. Responsive to receiving a request to accommodate a preview stream and a snapshot stream, camera module 72 outputs, to system memory module 74, a request to increase a bandwidth between ISP 14 and system memory 30 to accommodate the preview stream, where the request to increase the bandwidth to accommodate the preview stream refrains from accommodating the snapshot stream. For instance, rather than voting for an increase in bandwidth to accommodate both the preview stream and the snapshot stream, camera module 72 only votes for additional bandwidth to accommodate the preview stream. Camera module 72 receives a request to generate an image, for storage at the system memory, that corresponds to an image being output by the preview stream. For instance, application 52, via application framework 54, outputs a request to perform a snapshot operation associated with the preview stream. Responsive to receiving the request to generate an image, for storage at system memory 30, that corresponds to an image being output by the preview stream, camera module 72 outputs, to system memory module 74, a request to further increase the bandwidth to accommodate the snapshot stream.

Figure 3:
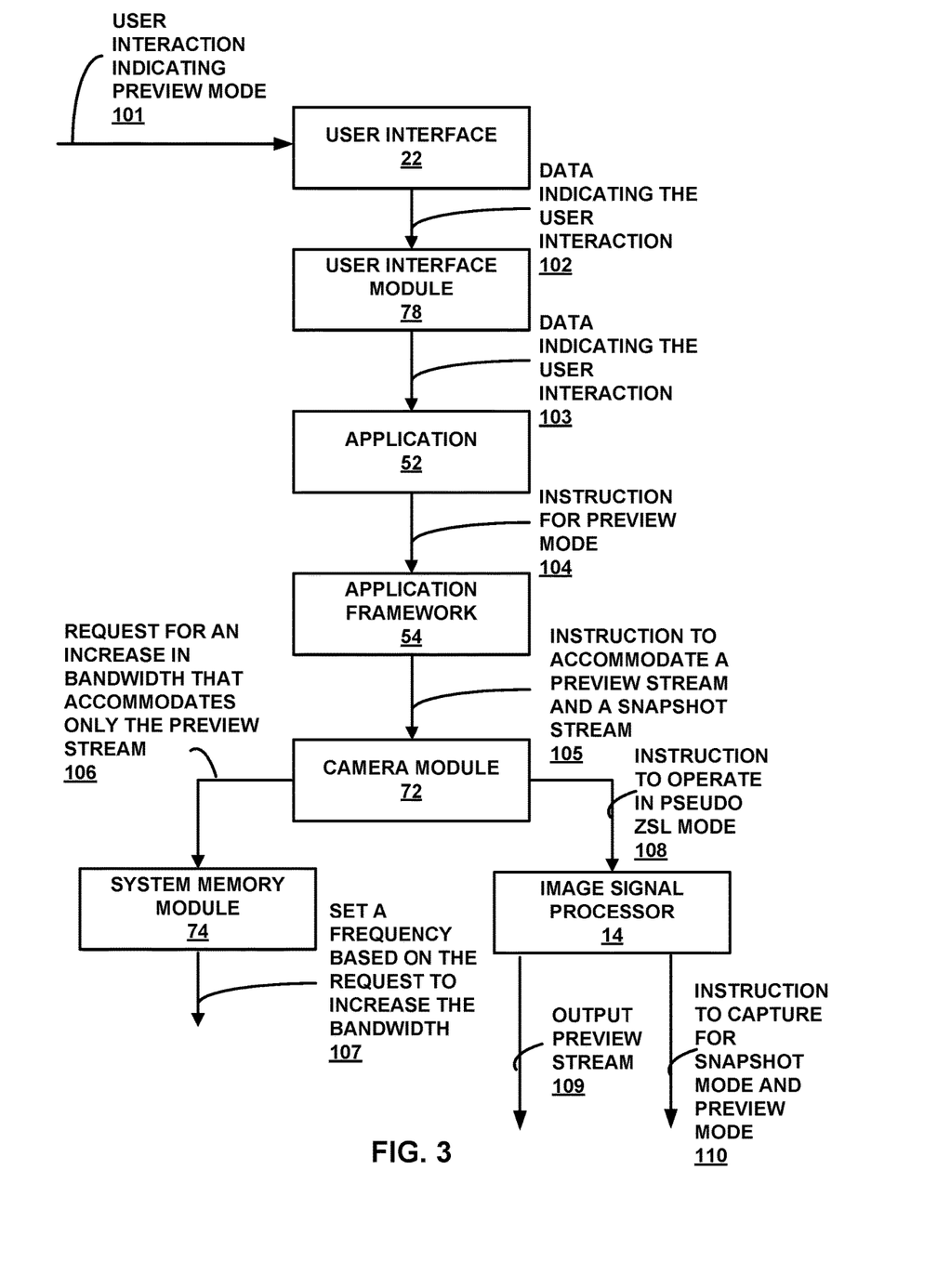
FIG. 3 is a block diagram showing an exemplary process for increasing a bandwidth for a preview mode, in accordance with one or more aspects of the present disclosure.

FIG. 3 is a block diagram showing an exemplary process for increasing a bandwidth for a preview mode, in accordance with one or more aspects of the present disclosure. In the example of FIG. 3, user interface 22 receives a user interaction indicating preview mode 101. User interface 22 generates data indicating user interaction 102. User interface 22 outputs, to user interface module 78, data indicating the user interaction 103. Application 52 receives the data indicating the user interaction 103 and outputs an instruction for preview mode 104. In response to receiving the instruction for preview mode 104, application framework 54 outputs, to camera module 72, an instruction to accommodate a preview stream and a snapshot stream 105. Camera module 72 outputs, a request for an increase in bandwidth that accommodates only the preview stream 106 and outputs, to ISP 14, an instruction to operate in pseudo zero-shutter lag mode 108. System memory module 74 sets a frequency, for system memory 30, based on the request to increase the bandwidth 107. In response to receiving the instruction to operate in pseudo zero-shutter lag mode 108, ISP 14 outputs, to system memory 30, a preview stream 109 and outputs, to camera devices 12A-N, an instruction to capture for snapshot mode and preview mode 110 (e.g., pseudo zero-shutter lag mode). In this way, camera module 72 may refrain from requesting a bandwidth to accommodate a snapshot stream when only a preview stream is used by ISP 14.

Figure 4:
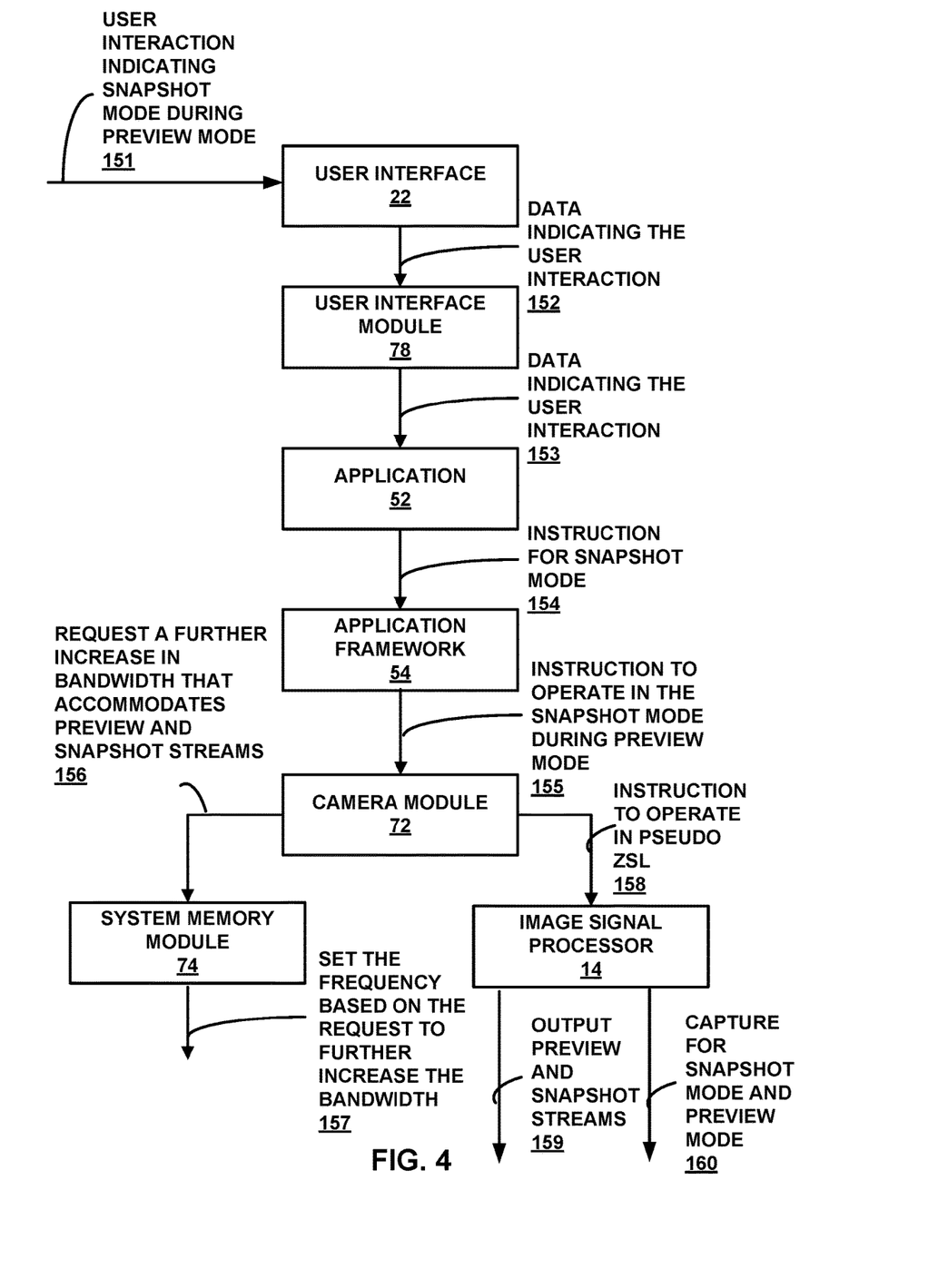
FIG. 4 is a block diagram showing an exemplary process for increasing a bandwidth for a snapshot mode during preview mode, in accordance with one or more aspects of the present disclosure.

FIG. 4 is a block diagram showing an exemplary process for increasing a bandwidth for a snapshot mode during preview mode, in accordance with one or more aspects of the present disclosure. In the example of FIG. 4, ISP 14 outputs, to system memory 30, a preview stream and outputs, to camera devices 12A-N, an instruction to capture for snapshot mode and preview mode (e.g., pseudo zero-shutter lag mode). In operation, user interface 22 receives a user interaction indicating a snapshot mode during preview mode 151. User interface 22 outputs, to user interface module 78, data indicating the user interaction 152. User interface module 78 outputs, to application 52, data indicating the user interaction 153. Application 52 receives the data indicating the user interaction 153 and outputs an instruction for snapshot mode 154.

In response to receiving the instruction for snapshot mode 154, application framework 54 outputs, to camera module 72, an instruction to operate the snapshot mode during preview mode 155. For instance, application framework 54 outputs, to camera module 72, an instruction to cause ISP 14 to output, in the snapshot stream, an image that corresponds to an image being output by the preview stream. Camera module 72 requests a further increase in bandwidth that accommodates the preview stream and the snapshot stream 156. Additionally, camera module 72 outputs, to ISP 14, an instruction to operate in pseudo zero-shutter lag mode 158. For instance, camera module 72 may instruct ISP 14 to cause camera devices 12A-N to capture content at a first resolution (e.g., 16 megapixels) and ISP 14 to output a representation of the captured content in the preview stream at a second resolution (e.g., 720P) that is less than the first resolution. System memory module 74 sets a frequency, for system memory 30, based on the request to further increase the bandwidth 157. ISP 14 outputs, to system memory 30, a preview stream and a snapshot stream 159. In this way, camera module 72 may request bandwidth to accommodate a snapshot stream with little or no shutter lag.

ISP 14 outputs, to camera devices 12A-N, an instruction to capture for snapshot mode and preview mode 160 (e.g., pseudo zero-shutter lag mode). For instance, camera module 72 outputs a request to generate an image that corresponds to the image being output by the preview stream and in response to receiving the request to generate the image that corresponds to the image being output by the preview stream, display interface module 76 outputs an instruction to cause display interface 26 to output, at display 28, the image that corresponds to the image being output by the preview stream. In some instances, the image that corresponds to the image being output by the preview stream has a first resolution (e.g., 16 megapixels) and the preview stream has a second resolution (e.g., 720P).

Figure 5:
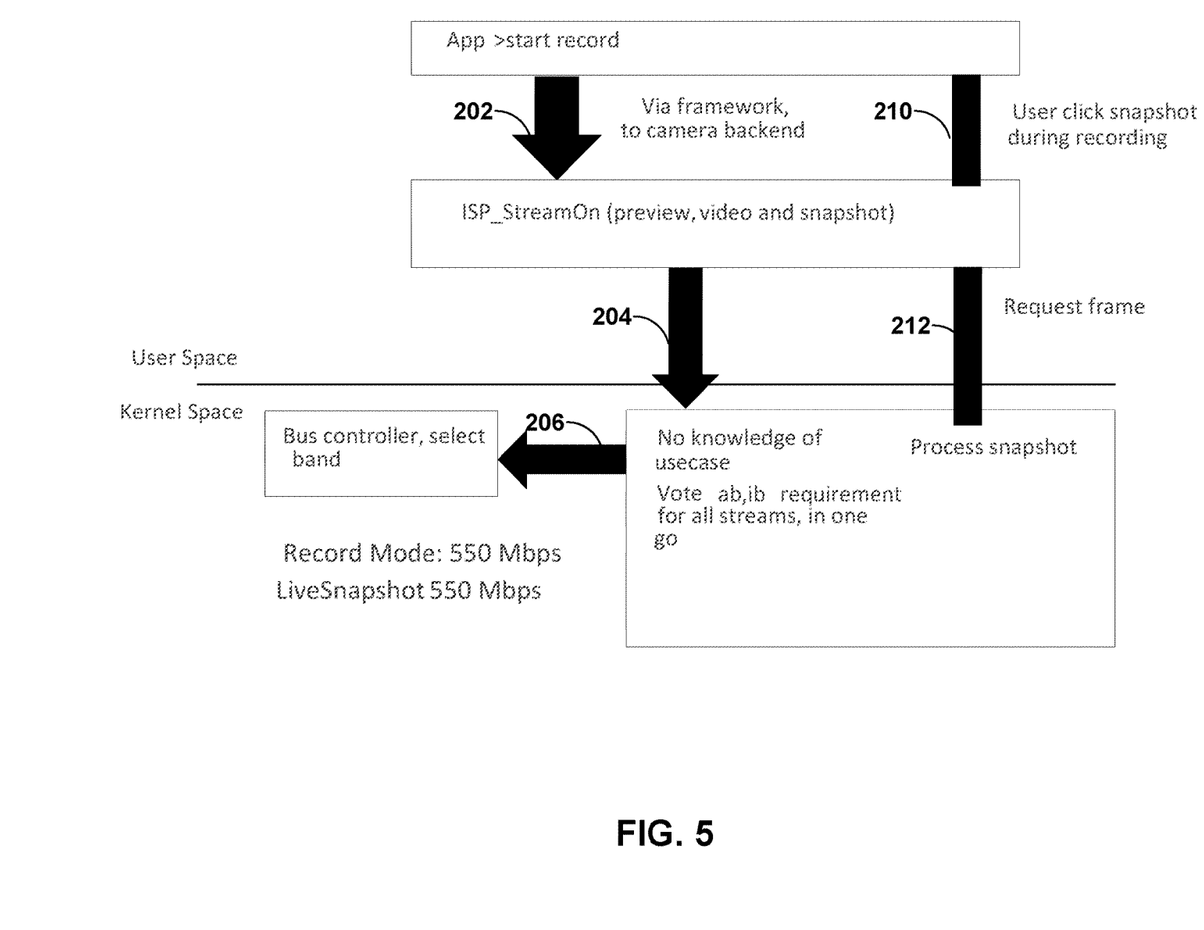
FIG. 5 is a block diagram showing an exemplary process for voting for an increase in a bandwidth for a preview mode and a snapshot mode, in accordance with one or more aspects of the present disclosure.

FIG. 5 is a block diagram showing an exemplary process for voting for an increase in a bandwidth for a preview mode and a snapshot mode, in accordance with one or more aspects of the present disclosure. In the example of FIG. 5, application 52 outputs an instruction to start recording 202. Application 52, outputs, via application framework 54, to camera module 72, a request to accommodate a preview stream and a snapshot stream 204. For example, application 52, outputs, via application framework 54, to camera module 72, an instruction ISP_StreamON (preview, video and snapshot) that indicates an instruction to operate ISP 14 in both preview mode and snapshot mode. Said differently, CPU 16 generates, with application framework 54 operating at CPU 16, an instruction to configure system memory 30 to accommodate the preview stream and the snapshot stream. In some examples, CPU 16 generates the instruction to configure system memory 30 to accommodate the preview stream and the snapshot stream in response to receiving an instruction to operate the image signal processor in a preview mode (e.g., the instruction to start recording 202).

In the example of FIG. 5, camera module 72 votes absolute bandwidth (AB) and instantaneous bandwidth (IB) for a preview stream and a snapshot stream 206 upon receiving the instruction ISP_StreamON (preview, video and snapshot) that indicates an instruction to operate ISP 14 in both preview mode and snapshot mode 204. As such, system memory module 74 accommodates an additional 550 Mbps. Additionally, in the example of FIG. 5, user interface 22 generates data indicating that a user clicks a snapshot during recording 210 and application 52 outputs, via application framework 54, to camera module 72, an instruction that requests a frame 212 (e.g., a snapshot operation). In the example of FIG. 5, system memory module 74 has previously accommodated the 550 Mbps for a live snapshot.

Figure 6:
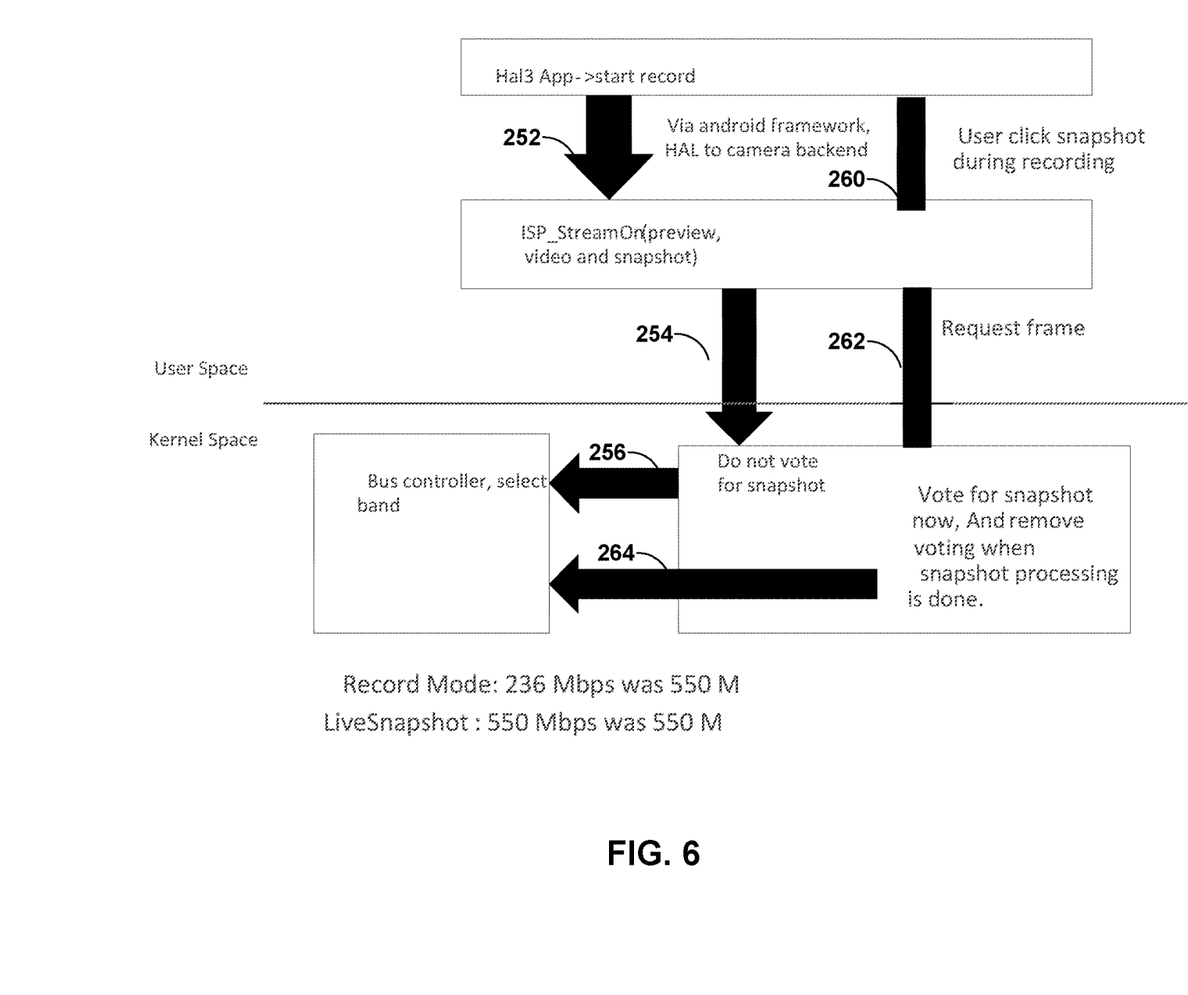
FIG. 6 is a block diagram showing an exemplary process for voting for an increase in a bandwidth for a preview mode and subsequently voting for a further increase in the bandwidth for a snapshot mode, in accordance with one or more aspects of the present disclosure.

FIG. 6 is a block diagram showing an exemplary process for voting for an increase in a bandwidth for a preview mode and subsequently voting for a further increase in the bandwidth for a snapshot mode, in accordance with one or more aspects of the present disclosure. In the example of FIG. 6, application 52 outputs an instruction to start recording 252. Application 52, outputs, via application framework 54, to camera module 72, an instruction ISP_StreamON (preview, video and snapshot) that indicates an instruction to operate ISP 14 in both preview mode and snapshot mode 254. In the example of FIG. 6, however, camera module 72 votes absolute bandwidth (AB) and instantons bandwidth (IB) for only a preview stream 256 upon receiving the instruction ISP_StreamON (preview, video and snapshot) that indicates an instruction to operate ISP 14 in both preview mode and snapshot mode 254. For instance, system memory module 74 may calculate a bandwidth between ISP 14 and system memory 30 that accommodates only an additional 236 Mbps. In this example, system memory module 74 may cause system memory 30 to operate at a frequency that is determined using the bandwidth such that system memory 30 has an additional bandwidth allocated between ISP 14 and system memory 30 that exceeds the additional bandwidth of 236 Mbps.

Additionally, in the example of FIG. 6, user interface 22 generates data indicating that a user clicks a snapshot during recording 260 and application 52 outputs, via application framework 54, to camera module 72, an instruction that requests a frame 262 (e.g., a snapshot operation). In the example of FIG. 6, camera module 72 votes absolute bandwidth (AB) and instantaneous bandwidth (IB) for a preview stream and a snapshot stream 264 upon receiving the instruction that requests a frame 262. For instance, system memory module 74 may calculate a bandwidth between ISP 14 and system memory 30 that accommodates an additional 314 Mbps or total increase of 550 Mbps. In this example, system memory module 74 may cause system memory 30 to operate at a frequency that is determined using the bandwidth such that system memory 30 has an additional bandwidth allocated between ISP 14 and system memory 30 that exceeds the additional bandwidth of 314 Mbps for the snapshot stream or total increase of 550 Mbps for the snapshot stream and preview stream.

Figure 7:
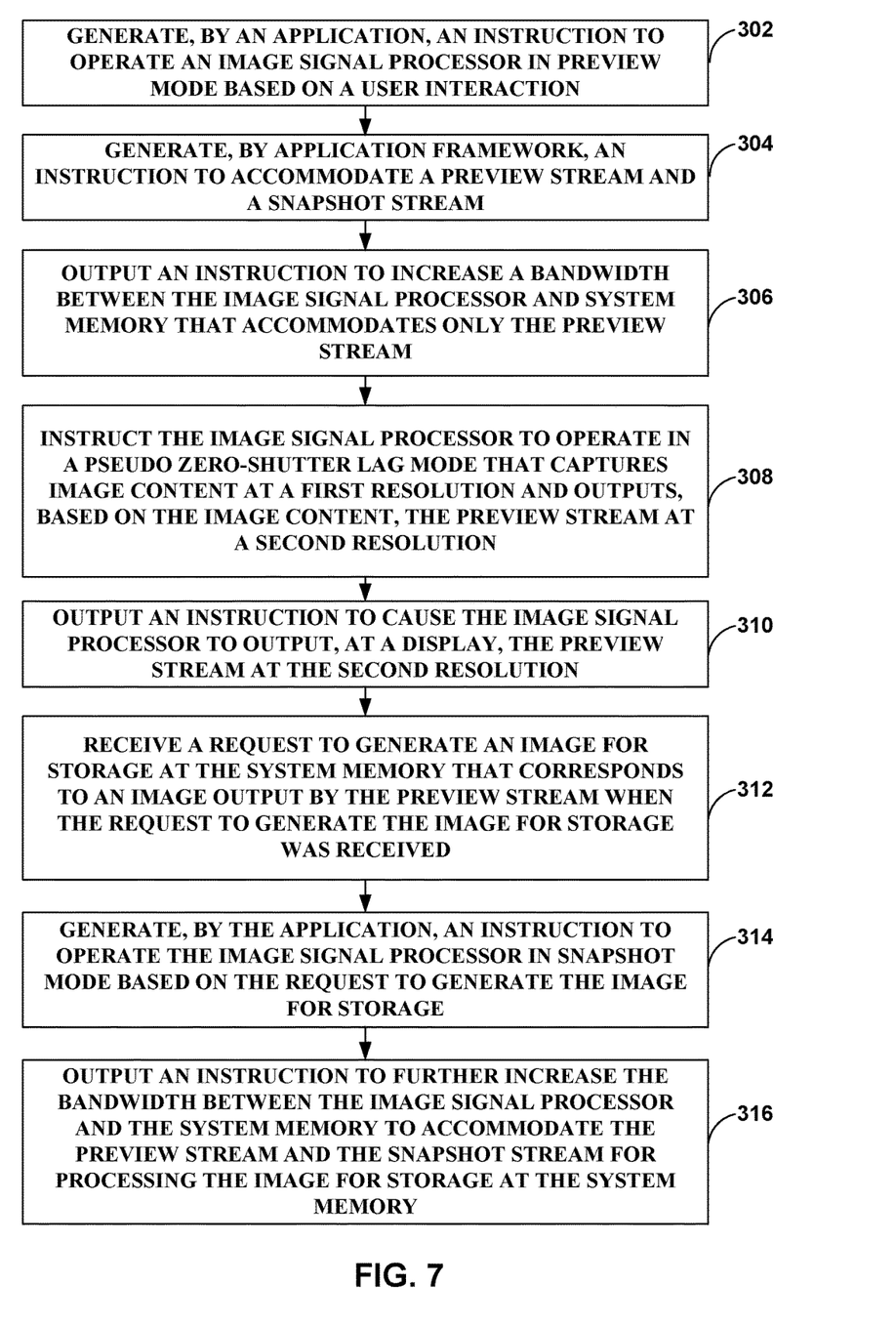
FIG. 7 is a flowchart illustrating an exemplary operation for refraining from increasing bandwidth for snapshot mode, in accordance with one or more aspects of the present disclosure.

FIG. 7 is a flowchart illustrating an exemplary operation for refraining from increasing bandwidth for snapshot mode, in accordance with one or more aspects of the present disclosure. In the example of FIG. 7, application 52 generates an instruction to operate ISP 14 in preview mode based on a user interaction (302). For instance, in response to user interface 22 generating data indicating a user interaction, application 52 determines that the user interaction indicates a selection of a graphical element corresponding to a preview operation and generates the instruction to operate ISP 14 in preview mode. Application framework 54 generates an instruction to accommodate a preview stream and a snapshot stream (304). For instance, application framework 54 outputs, to camera module 72, an instruction ISP_StreamON (preview, video and snapshot) that indicates an instruction to operate ISP 14 in both preview mode and snapshot mode. Camera module 72 outputs an instruction to increase a bandwidth between ISP 14 and system memory 30 that accommodates only the preview stream (306). For instance, camera module 72 votes absolute bandwidth (AB) and instantons bandwidth (IB) for only a preview stream upon receiving the instruction ISP_StreamON (preview, video and snapshot) that indicates an instruction to operate ISP 14 in both preview mode and snapshot mode. In this way, camera module 72 may refrain from requesting additional bandwidth for a snapshot mode (e.g., a snapshot stream) until a user requests a snapshot operation such that an operating frequency at system memory 30 may be reduced, which may result in a lower power consumption at device 10.

Camera module 72 instructs ISP 14 to operate in a pseudo zero-shutter lag mode that captures image content at a first resolution and outputs, based on the image content, the preview stream at a second resolution (308). For instance, camera module 72 outputs, to ISP 14, an instruction to output a preview stream containing images at the second resolution (e.g., 1080P) and to output, to camera devices 12A-N, an instruction to capture for snapshot mode at the first resolution (e.g., 16 megapixels). Camera module 72 outputs an instruction to cause ISP 14 to output, at display 28, the preview stream at the second resolution (310). For instance, camera module 72 outputs, to ISP 14, an instruction to display interface module 76 to output the preview stream and display interface module 76 causes, via display interface, display 28 to output images, at the second resolution, contained in the preview stream. In this way, device 10 may be configured to perform a snapshot operation without significant delay because pseudo zero-shutter lag mode may configure the sensors of camera devices 12A-N for the first resolution (e.g., 16 megapixels) for a snapshot operation.

Application 52 receives a request to generate an image for storage at system memory 30 that corresponds to an image output by the preview stream when the request to generate the image for storage was received (312). For instance, in response to user interface 22 generating data indicating a user interaction, application 52 determines that the user interaction indicates a selection of a graphical element corresponding to a snapshot operation to the image output by the preview stream. Application 52 generates, an instruction to operate ISP 14 in snapshot mode based on the request to generate the image for storage (314). Camera module 72 outputs an instruction to further increase the bandwidth between ISP 14 and system memory 30 to accommodate the preview stream and a snapshot stream for processing the image for storage at system memory 30 (316). In this way, camera module 72 may reduce a bandwidth allocated between ISP 14 and system memory 30, thereby resulting in a reduction in power usage by device 10. More specifically, device 10, when configured to use one or more techniques described herein for refraining from allocating bandwidth for a snapshot stream, may reduce a current consumption by 20 milliamps compared with devices that are not configured to use the one or more techniques described herein for refraining from allocating bandwidth for the snapshot stream.

In one or more examples, the functions described may be implemented in hardware, software, firmware, or any combination thereof. If implemented in software, the functions may be stored on, as one or more instructions or code, a computer-readable medium and executed by a hardware-based processing unit. Computer-readable media may include computer-readable storage media, which corresponds to a tangible medium such as data storage media. In this way, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for image generation, the method comprising:
    receiving, from an application framework operating at a processor, a request to accommodate a preview stream and a snapshot stream, the request to accommodate comprising an instruction to configure a system memory to allocate a bandwidth between an image signal processor and the system memory that accommodates the preview stream and the snapshot stream;
    responsive to receiving the request to accommodate the preview stream and the snapshot stream, outputting, to a memory controller for the system memory, a request to increase a bandwidth allocated between the image signal processor and the system memory to accommodate the preview stream, wherein the request to increase the bandwidth allocated between the image signal processor and the system memory to accommodate the preview stream refrains from allocating bandwidth between the image signal processor and the system memory to accommodate the snapshot stream; and
    responsive to receiving, from the application framework, a request to generate an image, for storage at the system memory, that corresponds to an image being output by the preview stream, outputting, to the memory controller, a request to further increase the bandwidth allocated between the image signal processor and the system memory to accommodate the snapshot stream.

2. The method of claim 1, further comprising:
    generating, with the application framework, the instruction to configure the system memory to accommodate the preview stream and the snapshot stream in response to receiving, from an application operating at the processor, an instruction to operate the image signal processor in a preview mode.

3. The method of claim 1, wherein receiving the request to generate the image that corresponds to the image being output by the preview stream comprises:

receiving, from the application framework operating at the processor, an instruction to cause the image signal processor to output, in the snapshot stream, the image that corresponds to the image being output by the preview stream.

4. The method of claim 1, further comprising:
instructing the image signal processor to cause one or more camera devices to capture content at a first resolution and to output a representation of the captured content in the preview stream at a second resolution that is less than the first resolution.

5. The method of claim 4, further comprising:
responsive to receiving the request to generate the image that corresponds to the image being output by the preview stream, causing an output, at a display, of the image that corresponds to the image being output by the preview stream.

6. The method of claim 5, wherein the image that corresponds to the image being output by the preview stream has the first resolution.

7. The method of claim 1, wherein the bandwidth is a first bandwidth, the method further comprising:
responsive to receiving the request to accommodate the preview stream and the snapshot stream, calculating a second bandwidth between the image signal processor and the system memory to accommodate additional bandwidth for the preview stream, wherein outputting the request to increase the first bandwidth allocated between the image signal processor and the system memory to accommodate the preview stream indicates the second bandwidth.

8. The method of claim 7, further comprising:
causing the system memory to operate at a frequency that is determined using the second bandwidth.

9. The method of claim 1, wherein receiving the request to accommodate the preview stream and the snapshot stream comprises:
receiving a user interaction indicating an instruction to operate the image signal processor in a preview mode, wherein outputting the request to increase the bandwidth allocated between the image signal processor and the system memory to accommodate the preview stream is in response to receiving the user interaction to operate the image signal processor in the preview mode.

10. The method of claim 1, wherein receiving the request to generate the image that corresponds to the image being output by the preview stream comprises:
receiving a user interaction indicating an instruction to operate the image signal processor in a snapshot mode, wherein outputting the request to further increase the bandwidth allocated between the image signal processor and the system memory to accommodate the snapshot stream is in response to receiving the user interaction indicating the instruction to operate the image signal processor in the snapshot mode.

11. A device for image generation, the device comprising:
one or more processors;
an image signal processor;
system memory; and
a memory controller for the system memory,
wherein the one or more processors are configured to:
receive, from an application framework operating at the one or more processors, a request to accommodate a preview stream and a snapshot stream, the request to accommodate comprising an instruction to configure the system memory to allocate a bandwidth between the image signal processor and the system memory that accommodates the preview stream and the snapshot stream;
responsive to receiving the request to accommodate the preview stream and the snapshot stream, output, to the memory controller, a request to increase a bandwidth allocated between the image signal processor and the system memory to accommodate the preview stream,
wherein the request to increase the bandwidth allocated between the image signal processor and the system memory to accommodate the preview stream refrains from allocating bandwidth between the image signal processor and the system memory to accommodate the snapshot stream; and
responsive to receiving, from the application framework, a request to generate an image, for storage at the system memory, that corresponds to an image being output by the preview stream, output, to the memory controller, a request to further increase the bandwidth allocated between the image signal processor and the system memory to accommodate the snapshot stream.

12. The device of claim 11, wherein the one or more processors are further configured to:
generate the instruction to configure the system memory to accommodate the preview stream and the snapshot stream in response to receiving, from an application operating at the one or more processors, an instruction to operate the image signal processor in a preview mode.

13. The device of claim 11, wherein the one or more processors are further configured to:
generate, with the application framework operating at the one or more processors, an instruction to cause the image signal processor to output, in the snapshot stream, the image that corresponds to the image being output by the preview stream,
wherein the one or more processors are further configured to output the request to further increase the bandwidth allocated between the image signal processor and the system memory to accommodate the snapshot stream further in response to generating the instruction to cause the image signal processor to output, in the snapshot stream, the image that corresponds to the image being output by the preview stream.

14. The device of claim 11, wherein the one or more processors are further configured to:
instruct the image signal processor to cause one or more camera devices to capture content at a first resolution and to output a representation of the captured content in the preview stream at a second resolution that is less than the first resolution.

15. The device of claim 14, wherein the one or more processors are further configured to:
responsive to receiving the request to generate the image that corresponds to the image being output by the preview stream, cause an output, at a display, of the image that corresponds to the image being output by the preview stream.

16. The device of claim 15, wherein the image that corresponds to the image being output by the preview stream has the first resolution.

17. The device of claim 11, wherein the bandwidth is a first bandwidth and wherein the one or more processors are further configured to:

responsive to receiving the request to accommodate the preview stream and the snapshot stream, calculate a second bandwidth between the image signal processor and the system memory to accommodate additional bandwidth for the preview stream, wherein the request to increase the first bandwidth indicates the second bandwidth.

18. The device of claim 17, wherein the one or more processors are further configured to:
cause the system memory to operate at a frequency that is determined using the second bandwidth.

19. The device of claim 11, wherein the one or more processors are further configured to:
receive data indicating a user interaction, the user interaction indicating an instruction to operate the image signal processor in a preview mode,
wherein the one or more processors are further configured to output the request to increase the bandwidth allocated between the image signal processor and the system memory to accommodate the preview stream in response to receiving the data indicating the user interaction.

20. The device of claim 11, wherein the one or more processors are further configured to:
receive data indicating a user interaction, the user interaction indicating an instruction to operate the image signal processor in a snapshot mode,
wherein the one or more processors are further configured to output the request to further increase the bandwidth allocated between the image signal processor and the system memory to accommodate the snapshot stream in response to receiving the data indicating the user interaction.

21. A non-transitory computer-readable medium having instructions stored thereon that, when executed, cause one or more processors to:
receive, from an application framework operating at the one or more processors, a request to accommodate a preview stream and a snapshot stream, the request to accommodate comprising an instruction to configure a system memory to allocate a bandwidth between an image signal processor and the system memory that accommodates the preview stream and the snapshot stream;
responsive to receiving the request to accommodate the preview stream and the snapshot stream, output, to a memory controller for the system memory, a request to increase a bandwidth allocated between the image signal processor and the system memory to accommodate the preview stream,
wherein the request to increase the bandwidth allocated between the image signal processor and the system memory to accommodate the preview stream refrains from allocating bandwidth between the image signal processor and the system memory to accommodate the snapshot stream; and
responsive to receiving, from the application framework, a request to generate an image, for storage at the system memory, that corresponds to an image being output by the preview stream, output, to the memory controller, a request to further increase the bandwidth allocated between the image signal processor and the system memory to accommodate the snapshot stream.

22. The non-transitory computer-readable medium of claim 21, wherein the instructions further cause the one or more processors to:
generate the instruction to configure the system memory to accommodate the preview stream and the snapshot stream in response to receiving, from an application operating at the one or more processors, an instruction to operate the image signal processor in a preview mode.

23. The non-transitory computer-readable medium of claim 21, wherein the instructions further cause the one or more processors to:
generate, with the application framework operating at the one or more processors, an instruction to cause the image signal processor to output, in the snapshot stream, the image that corresponds to the image being output by the preview stream,
wherein the one or more processors are configured to output the request to further increase the bandwidth allocated between the image signal processor and the system memory to accommodate the snapshot stream further in response to generating the instruction to cause the image signal processor to output, in the snapshot stream, the image that corresponds to the image being output by the preview stream.

24. The non-transitory computer-readable medium of claim 21, wherein the instructions further cause the one or more processors to:
instruct the image signal processor to cause one or more camera devices to capture content at a first resolution and to output a representation of the captured content in the preview stream at a second resolution that is less than the first resolution.

25. The non-transitory computer-readable medium of claim 24, wherein the instructions further cause the one or more processors to:
responsive to receiving the request to generate the image that corresponds to the image being output by the preview stream, cause an output, at a display, of the image that corresponds to the image being output by the preview stream.

26. The non-transitory computer-readable medium of claim 25, wherein the image that corresponds to the image being output by the preview stream has the first resolution.

27. A device for image generation, the device comprising:
means for receiving, from an application framework, a request to accommodate a preview stream and a snapshot stream, the request to accommodate comprising an instruction to configure a system memory to allocate a bandwidth between an image signal processor and the system memory that accommodates the preview stream and the snapshot stream;
means for outputting, to a memory controller for the system memory, a request to increase a bandwidth allocated between the image signal processor and the system memory to accommodate the preview stream in response to receiving the request to accommodate the preview stream and the snapshot stream,
wherein the request to increase the bandwidth allocated between the image signal processor and the system memory to accommodate the preview stream refrains from allocating bandwidth between the image signal processor and the system memory to accommodate the snapshot stream; and
means for outputting, to the memory controller, a request to further increase the bandwidth allocated between the image signal processor and the system memory to accommodate the snapshot stream in response to receiving, from the application framework, a request to generate an image, for storage at the system memory, that corresponds to an image being output by the preview stream.

* * * * *